United States Patent
Davis et al.

(10) Patent No.: US 10,876,388 B2
(45) Date of Patent: Dec. 29, 2020

(54) RECLAMATION OF BRINES WITH METAL CONTAMINATION USING LIME

(71) Applicant: Halliburton Energy Services, Inc., Houston, TX (US)

(72) Inventors: Chesnee L. Davis, The Woodlands, TX (US); Jay P. Deville, Spring, TX (US); Matthew L. Miller, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 138 days.

(21) Appl. No.: 15/547,752

(22) PCT Filed: Mar. 7, 2015

(86) PCT No.: PCT/US2015/019334
§ 371 (c)(1),
(2) Date: Jul. 31, 2017

(87) PCT Pub. No.: WO2016/144305
PCT Pub. Date: Sep. 15, 2016

(65) Prior Publication Data
US 2018/0023376 A1 Jan. 25, 2018

(51) Int. Cl.
*E21B 43/34* (2006.01)
*E21B 21/06* (2006.01)
*C09K 8/66* (2006.01)
*C09K 8/04* (2006.01)

(52) U.S. Cl.
CPC ............ *E21B 43/34* (2013.01); *E21B 21/063* (2013.01); *E21B 21/068* (2013.01); *C09K 8/04* (2013.01); *C09K 8/66* (2013.01)

(58) Field of Classification Search
CPC ................................ E21B 21/06; E21B 43/34
See application file for complete search history.

(56) References Cited

U.S. PATENT DOCUMENTS

| | | | |
|---|---|---|---|
| 4,710,306 A | 12/1987 | Kirsch | |
| 4,895,665 A | 1/1990 | Colelli et al. | |
| 7,022,240 B2 * | 4/2006 | Hart | C02F 1/66 |
| | | | 175/66 |

(Continued)

OTHER PUBLICATIONS

Javora, P. H., and Q. Qu. "On-Site Iron-in-Brine Removal: A Technological Advance." SPE International Symposium on Oilfield Chemistry. Society of Petroleum Engineers, 2005.

(Continued)

*Primary Examiner* — David J Bagnell
*Assistant Examiner* — Dany E Akakpo
(74) *Attorney, Agent, or Firm* — McGuireWoods LLP

(57) ABSTRACT

A method of removing a soluble metal ion from a contaminated brine fluid comprising: adding lime to the contaminated brine fluid, wherein the lime causes the soluble metal ion to become insoluble in the contaminated brine fluid; and passing the contaminated brine fluid through a filter media, wherein the step of passing is performed after the step of adding, and wherein after the brine fluid is passed through the filter media, a brine fluid having a reduced concentration of the metal ion is produced. Another method of removing a soluble metal ion from a contaminated brine fluid comprises: passing the contaminated brine fluid through a filter media, wherein the filter media comprises the lime.

20 Claims, 2 Drawing Sheets

(56) References Cited

U.S. PATENT DOCUMENTS

| | | | |
|---|---|---|---|
| 9,758,717 B2* | 9/2017 | Woodul | B01J 19/18 |
| 2005/0274677 A1 | 12/2005 | Isaac | |
| 2007/0102359 A1* | 5/2007 | Lombardi | B01D 17/085 |
| | | | 210/639 |
| 2007/0131623 A1 | 6/2007 | Javora et al. | |
| 2011/0062085 A1 | 3/2011 | Deville et al. | |
| 2012/0145646 A1 | 6/2012 | Bae et al. | |
| 2015/0021273 A1* | 1/2015 | Frisk | E21B 43/34 |
| | | | 210/709 |

OTHER PUBLICATIONS

Foxenberg, W. E., L. R. Houchin, and P. H. Javora. "Optimizing the Quality of High-Density Brines for Maximum Performance and Economic Value." SPE Annual Technical Conference and Exhibition. Society of Petroleum Engineers, 1992.

International Search Report and Written Opinion dated Oct. 29, 2015; International PCT Application No. PCT/US2015/019334.

Canadian Office Action dated Feb. 14, 2019; Canadian Patent Application No. 2,971,851.

* cited by examiner

RECLAMATION OF BRINES WITH METAL CONTAMINATION USING LIME

TECHNICAL FIELD

Brines are used in a variety of oil and gas operations. The brines can become contaminated with metal ions, such as iron and zinc. The contaminated brines can be processed to remove the metal contaminants. The brines can then be safely stored or reused in other oil and gas operations.

BRIEF DESCRIPTION OF THE FIGURES

The features and advantages of certain embodiments will be more readily appreciated when considered in conjunction with the accompanying FIGURES. The FIGURES are not to be construed as limiting any of the preferred embodiments.

DETAILED DESCRIPTION

Figure 1:
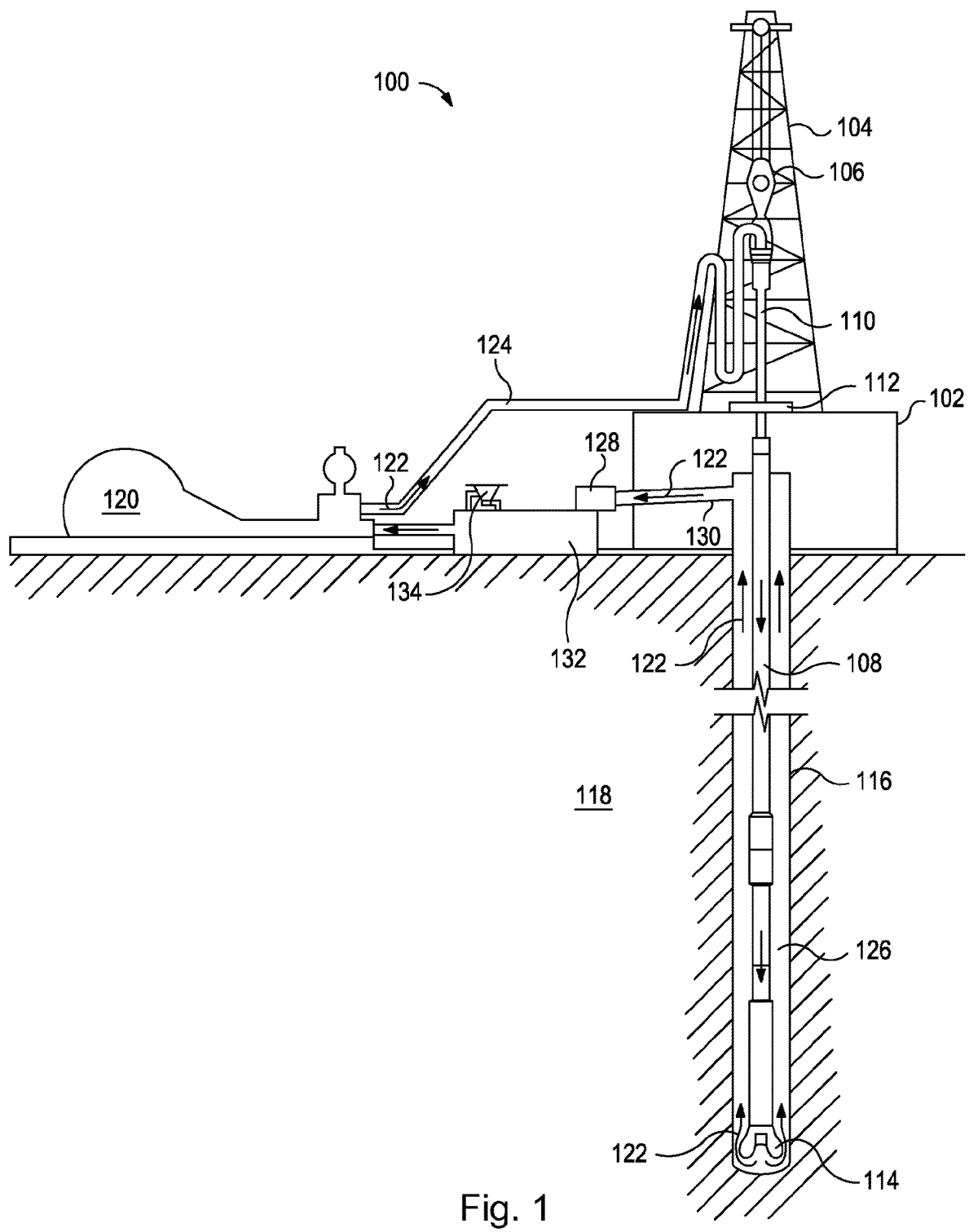
FIG. 1 illustrates a system for preparation and delivery of a treatment fluid to a wellbore according to certain embodiments.

Oil and gas hydrocarbons are naturally occurring in some subterranean formations. In the oil and gas industry, a subterranean formation containing oil or gas is referred to as a reservoir. A reservoir may be located under land or offshore. Reservoirs are typically located in the range of a few hundred feet (shallow reservoirs) to tens of thousands of feet (ultra-deep reservoirs). In order to produce oil or gas, a wellbore is drilled into a reservoir or adjacent to a reservoir. The oil, gas, or water produced from the wellbore is called a reservoir fluid.

As used herein, a "fluid" is a substance having a continuous phase that tends to flow and to conform to the outline of its container when the substance is tested at a temperature of 71° F. (22° C.) and a pressure of 1 atmosphere "atm" (0.1 megapascals "MPa"). A fluid can be a liquid or gas. A homogenous fluid has only one phase; whereas a heterogeneous fluid has more than one distinct phase. A heterogeneous fluid can be: a slurry, which includes an external liquid phase and undissolved solid particles as the internal phase; an emulsion, which includes an external liquid phase and at least one internal phase of immiscible liquid droplets; a foam, which includes an external liquid phase and a gas as the internal phase; or a mist, which includes an external gas phase and liquid droplets as the internal phase.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore. As used herein, "into a subterranean formation" means and includes into any portion of a subterranean formation, including into a well, wellbore, or the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

A treatment fluid can be used to treat a portion of a wellbore. Examples of common treatment fluids include, but are not limited to, drilling fluids, spacer fluids, cement compositions, completion fluids, stimulation fluids (e.g., fracturing fluids), and workover fluids. As used herein, a "treatment fluid" is a fluid designed and prepared to resolve a specific condition of a well or subterranean formation, such as for stimulation, isolation, gravel packing, or control of gas or water coning. The term "treatment fluid" refers to the specific composition of the fluid as it is being introduced into a well. The word "treatment" in the term "treatment fluid" does not necessarily imply any particular action by the fluid.

It is often desirable to use a brine in an oil or gas operation. A brine is a fluid containing salt that generally has a density of about 8 to 20 pounds per gallon (ppg) (0.96 to 2.4 kilograms per liter (kg/L)). The specific properties of brines are determined by the brine composition. Brines commonly include salts of sodium, calcium, or zinc, or some combination thereof. However, brines can be undesirably expensive due to the cost of the salt used and the quantity at which the salt must be added to the fluid to reach the desired fluid density.

Brines can become contaminated with metal ions, which can pose health or safety concerns to operators, as well as environmental concerns. One category of contamination concern is the soluble heavy metal contaminants, and of particular concern is iron. Because high-density brines are corrosive, they can collect iron from the tubing strings and casings in the wellbore during their use. Additionally, iron can be accumulated from starting materials and during transport, storage, and handling of the brine. By way of another example, salts of zinc can be added in conjunction with other salts, such as calcium bromide or calcium chloride, to increase the density of the brine to a desired density. Salts of zinc can be used as a heavy weighting additive in which the desired density can be achieved with lower concentrations compared to other salts. Due to an inherently low pH, zinc brines are particularly corrosive; and therefore, are particularly prone to the solubilization and stabilization of iron ions, making zinc brines one of the most difficult of the brines used to treat for iron contamination. Moreover, calcium-based brines can contain zinc in small concentrations. However, it is often desirable to be able to remove the zinc at a later time.

It is not uncommon for the metal ions to contaminate the brine in concentrations greater than 3% by weight of the brine. Generally, contamination levels of greater than about 2% by weight of the brine are too high to use the brine in wellbore operations, but can vary region to region depending on environmental regulations. Therefore, it is often desirable to reclaim the brine to remove contaminants.

Filtration is a common method for reclamation of the metal contaminants. Iron contamination in brines can include ferrous ($Fe^{2+}$) and ferric ($Fe^{3+}$) iron ions, as well as iron insolubles such as iron hydroxide and solid iron. However, the soluble ions generally cannot be removed by normal filtration because they are part of the solution. Therefore, methods of removing soluble iron have centered on precipitating the ions out of the brine solution. For example, some methods involve raising the pH of the brine with basic chemicals to initiate the formation of insoluble iron hydroxide from the iron ions. Raising the pH of zinc brines can be difficult because the brine is buffered by zinc hydroxide complexes. Additionally, the pH of the brine must be restored prior to its continued use. Other methods involve the use of oxidizing agents. In zinc brine especially, a large portion of the iron ions exist in the ferrous oxidation state, due to the low solubility of oxygen in the brine. The ferrous iron (II) oxidation state is more soluble than the ferric iron (III) oxidation state, and thus, oxidizing agents can convert iron ions to their less soluble state. Yet other methods involve the use of chelating agents to sequester the ions for removal.

However, these methods have drawbacks. Specifically, the methods can involve multiple steps in order to reclamate the brine, which leads to a more time consuming and costly procedure. Some of the additives needed to perform reclamation of the brine can be costly, pose health or safety concerns, and/or are ill-suited for treatment at the well site. Additionally, such methods generally alter the properties of the brine, such as density, pH, or viscosity. Therefore, the brine must then be reformulated to obtain the desirable properties. By way of example, when the density of the brine is lowered during the reclamation process, additional salts or weighting agents must be added to raise the density back to the desired density. Obviously, this adds cost and time to the overall reclamation process.

There is a continuing need and, thus, ongoing industry-wide interest in new methods for reclamation of brines that are contaminated with soluble and insoluble metal contaminants. It has been discovered that lime can be added to the contaminated brine, and then the brine can be filtered to remove the contaminants.

According to certain embodiments, a method of removing a soluble metal ion from a contaminated brine fluid comprises: adding lime to the contaminated brine fluid, wherein the lime causes the soluble metal ion to become insoluble in the contaminated brine fluid; and passing the contaminated brine fluid through a filter media, wherein the step of passing is performed after the step of adding, and wherein after the brine fluid is passed through the filter media, a brine fluid having a reduced concentration of the metal ion is produced.

According to other embodiments, a method of removing a soluble metal ion from a contaminated brine fluid comprises: passing the contaminated brine fluid through a filter media, wherein the filter media comprises the lime.

The discussion of preferred embodiments regarding the brine fluid or any ingredient in the brine fluid is intended to apply to all of the method embodiments. Any reference to the unit "gallons" means U.S. gallons.

The methods involve removing a soluble metal ion from a contaminated brine fluid. The soluble metal ion can be any metal, such as iron or zinc, or any combinations of metal ions that render the brine fluid unsuitable for use in oil or gas operations. As used herein, the term "soluble" means the ability of a substance to be dissolved into a brine fluid, such that the chemical cannot be removed by ordinary filtering means and at least 5 parts of the substance dissolves in 100 parts of the solvent (e.g., the brine fluid). In contrast, as used herein, the term "insoluble" means the inability of a chemical to be dissolved in the brine fluid, such that it can be removed by means of filtration.

As used herein, the term "brine" means nearly saturated, saturated, or supersaturated salt solutions. The salt can be selected from the group consisting of sodium chloride, calcium chloride, calcium bromide, potassium chloride, potassium bromide, magnesium chloride, sodium bromide, cesium formate, cesium acetate, and any combination thereof. The water-soluble salt can be in a concentration in the range of about 10% to about 70% by weight of the brine fluid.

The contaminated brine fluid can be a homogenous fluid or a heterogeneous fluid. The contaminated brine fluid can include a base fluid. The base fluid can include water. The water can be selected from the group consisting of freshwater, brackish water, seawater, and any combination thereof. The water can be the solvent of the homogeneous fluid or the external or internal phase of the heterogeneous fluid. The salt can be added to the water to form the brine fluid. An example of this embodiment is when the water is freshwater. The water can also already include the salt. An example of this is when the water is seawater in which the water already contains the salt. However, it should be understood that even if the water already includes a water-soluble salt, then an additional water-soluble salt can still be added to the water to form the brine fluid.

The brine fluid can have a first density. It should be understood that, as used herein, "first," "second," and "third," are arbitrarily assigned and are merely intended to differentiate between two or more densities, fluids, etc., as the case may be, and does not indicate any sequence. Furthermore, it is to be understood that the mere use of the term "first" does not require that there be any "second," and the mere use of the term "second" does not require that there be any "third," etc. The first density can be the density of the brine fluid prior to any contamination by the soluble metal ion. The brine fluid can also have a second density. The second density can be the density of the brine fluid after contamination by the soluble metal ion. The first density, the second density, or the first and second density of the brine fluid can be in a range of about 8 to about 20 ppg (about 0.9 to about 2.4 kg/L).

The brine fluid can be used in an oil or gas operation, such as for drilling, workover, completion, or stimulation operations. The brine fluid can become contaminated with the soluble metal ion prior to, during, or after use in the oil or gas operation. By way of example, the brine fluid can become contaminated during storage or preparations for use prior to performing the oil or gas operation. By way of another example, the brine fluid can become contaminated during the oil or gas operation due to contact with downhole tubing strings or other wellbore components.

According to certain embodiments, lime is added to the contaminated brine fluid. As used herein, the term "lime" includes any inorganic compound containing calcium and an oxide, carbonate, or hydroxide. The lime can be: quicklime, which is calcium oxide (CaO); slaked lime, which is calcium hydroxide ($Ca(OH)_2$); limestone, which is calcium carbonate ($CaCO_3$), or combinations thereof. The lime can be added to the contaminated brine fluid in a concentration in the range of about 3 to about 35 pounds per barrel (ppb) of the brine fluid. The lime can cause the viscosity of the brine fluid to increase. The amount of the viscosity increase can depend on the exact type of lime used. For example, for a given concentration, quicklime (CaO) will generally cause a greater increase in viscosity compared to slaked lime (Ca(OH)$_2$). The lime can also be in a concentration less than or equal to the concentration necessary to provide a desired viscosity for the brine fluid containing the lime. The desired viscosity can be selected such that the brine fluid is pumpable and can be used in an oil or gas operation.

According to certain other embodiments, the lime is part of a filter media. As used herein, the term "filter media" means a material through which the brine fluid is passed and is capable of entrapping, and thereby removing, contaminants. The lime can be included in the filter media in a concentration sufficient to cause some or all of the soluble metal ions to become insoluble in the brine fluid. The lime can also be included in a concentration such that the brine fluid has the desired viscosity after filtration through the filter media.

The lime, whether added directly to the contaminated brine fluid or included in the filter media, causes some or all of the soluble metal ions to become insoluble in the brine fluid. The oxide, carbonate, or hydroxide from the lime can chemically react with the metal ions present in the brine fluid to form an insoluble compound.

The brine fluid is passed through the filter media. As stated previously, the filter media can include the lime or the lime may already be present in the brine fluid prior to passing the brine fluid through the filter media. The filter media can include a filter aid. The filter aid can include diatomaceous earth, glass fibers, glass wool, silica gel, alumina, paper, activated charcoal, and other materials.

The filter media can be included in a filter assembly. The filter assembly can be any type and can be either batch or continuous. Some examples of suitable filter assemblies include, but are not limited to, parallel plate filters, Nutsche filters, rotary filters, and vertical- or horizontal-tubular filters. The contaminated brine fluid can be passed through the filter media using a pressure filter assembly. One advantage to using the lime and filter media method is that it is compatible with plate and frame type filters that can be operated at a rig site; thus, eliminating the need to transport the contaminated brine for treatment in a processing plant.

After the contaminated brine fluid is passed through the filter media, a brine fluid having a reduced concentration of the metal ion is produced. According to certain embodiments, the filter media removes some or all of the metal ions that reacted with the lime to become insoluble in the brine fluid. In this manner, the concentration of the metal ion contaminants is reduced after passing the brine fluid through the filter media. Of course, other insoluble contaminants in addition to the metal ions can also be removed from the brine fluid during passage through the filter media.

According to certain embodiments, the concentration of the metal ion is reduced to a desired concentration. The desired concentration can be less than or equal to a value that is acceptable in the industry as providing a filtered brine fluid that can be used in an oil or gas operation. The desired concentration can also be less than or equal to about 2% by weight of the brine fluid. The desired concentration can depend on the exact metal ions that are present in the contaminated brine fluid. Accordingly, the desired concentration can be different depending on the exact metal ions present in the brine fluid. When the lime is added to the brine fluid prior to filtration, the lime can be mixed with the brine fluid for a desired length of time and/or the lime and brine mixture can be allowed to sit for a desired length of time. The desired lengths of time can be in the range of about 30 minutes to 20 hours. The desired lengths of time can also be selected such that the metal ion concentration is reduced to the desired concentration. The temperature at which the contaminated brine fluid is filtered as well as the flow rate and total length of time of filtration can be selected to provide the desired concentration. By way of example, the temperature can be in the range of about 50° F. to about 200° F. (10° C. to 93° C.); the pressure for pressure filtration can be in the range of about 0 pounds force per square inch (psi) to about 1,000 psi (0 to 6.9 megapascal (MPa)); and the length of time for filtration can be in the range of about 12 hours to about 4 days.

After the contaminated brine fluid is passed through the filter media, the brine can be considered reclaimed and should be suitable for use in an oil or gas operation. The reclaimed brine fluid can have a third density. One of the advantages to the methods disclosed is that the density (and possibly other properties, such as pH) does not substantially change from the density of the brine fluid before passing the brine fluid through the filter media. As used herein, the term "substantially" means within +/−10%. According to certain embodiments, the third density is not substantially different from the first density, second density, or the first and second density.

According to the certain embodiments, the methods further include introducing the reclaimed brine fluid into a wellbore, wherein the wellbore penetrates a subterranean formation. The subterranean formation can be on land or offshore. The reclaimed brine fluid can be used in a drilling fluid, completion fluid, workover fluid, injection fluid, or stimulation fluid. The reclaimed brine fluid can be in a pumpable state before and during introduction into the wellbore. The well can be an oil, gas, and/or water production well, an injection well, or a geothermal well.

The exemplary fluids disclosed herein can directly or indirectly affect one or more components or pieces of equipment associated with the preparation, delivery, recapture, recycling, reuse, and/or disposal of the disclosed fluids. For example, and with reference to FIG. 1, the disclosed fluids can directly or indirectly affect one or more components or pieces of equipment associated with an exemplary wellbore assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, as well as other wellbore operations (e.g., completion, injection, workover, and stimulation) without departing from the scope of the disclosure.

The following discussion pertains to the use of the treatment fluid as a drilling fluid, but it should be understood that parts of the discussion can be equally applicable to other types of treatment fluids, such as completion fluids, stimulation fluids, etc. As illustrated, the wellbore assembly 100 can include a drilling platform 102 that supports a derrick 104 having a traveling block 106 for raising and lowering a drill string 108. The drill string 108 can include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

One or more of the disclosed fluids can be added to the drilling fluid 122 via a mixing hopper 134 communicably coupled to or otherwise in fluid communication with the retention pit 132. The mixing hopper 134 can include, but is not limited to, mixers and related mixing equipment known to those skilled in the art. In other embodiments, however, the disclosed fluids can be added to the drilling fluid 122 at any other location in the drilling assembly 100. In at least one embodiment, for example, there could be more than one retention pit 132, such as multiple retention pits 132 in series (not shown). Moreover, the retention pit 132 can be representative of one or more fluid storage facilities and/or units where the disclosed fluids can be stored, reconditioned, and/or regulated until added to the drilling fluid 122.

As mentioned above, the disclosed fluids can directly or indirectly affect the components and equipment of the drilling assembly 100. For example, the disclosed fluids can directly or indirectly affect the fluid processing unit(s) 128, which can include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the exemplary fluids.

The disclosed fluids can directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids, and any sensors (i.e., pressure, temperature, flow rate, etc.), gauges, and/or combinations thereof, and the like. The disclosed fluids can also directly or indirectly affect the mixing hopper 134 and the retention pit 132 and their assorted variations.

The disclosed fluids can also directly or indirectly affect the various downhole equipment and tools that can come into contact with the fluids such as, but not limited to, the drill string 108, any floats, drill collars, mud motors, downhole motors and/or pumps associated with the drill string 108, and any measuring while drilling/logging while drilling (MWD/LVW) tools and related telemetry equipment, sensors or distributed sensors associated with the drill string 108. The disclosed fluids can also directly or indirectly affect any downhole heat exchangers, valves and corresponding actuation devices, tool seals, packers and other wellbore isolation devices or components, and the like associated with the wellbore 116. The disclosed fluids can also directly or indirectly affect the drill bit 114, which can include, but is not limited to, roller cone bits, polycrystalline diamond compact (PDC) bits, natural diamond bits, any hole openers, reamers, coring bits, etc.

While not specifically illustrated herein, the disclosed fluids can also directly or indirectly affect any transport or delivery equipment used to convey the fluids to the drilling assembly 100 such as, any transport vessels, conduits, pipelines, trucks, tubulars, and/or pipes used to fluidically move the fluids from one location to another; any pumps, compressors, or motors used to drive the fluids into motion; any valves or related joints used to regulate the pressure or flow rate of the fluids; and any sensors (i.e., pressure and temperature), gauges, and/or combinations thereof, and the like.

Figure 2:
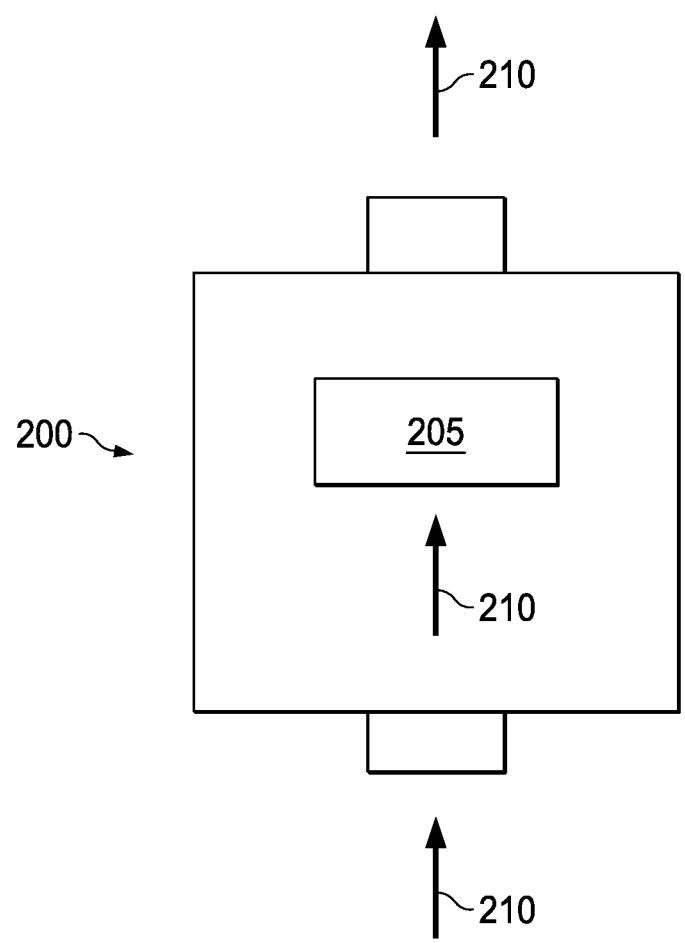
FIG. 2 illustrates a pressure filter assembly 200 used to filer a contaminated brine fluid 210 under pressure according to certain embodiments.

FIG. 2 illustrates a pressure filter assembly 200 used to filter a contaminated brine fluid 210 under pressure. Pressure filter assembly 200 comprises filter media 205. The contaminated brine fluid 210 may be pumped through the filter media 205 at a desired pressure. By way of example, the temperature can be in the range of about 50° F. to about 200° F. (10° C. to 93° C.); the pressure for pressure filtration can be in the range of about 0 pounds force per square inch (psi) to about 1,000 psi (0 to 6.9 megapascal (MPa)); and the length of time for filtration can be in the range of about 12 hours to about 4 days.

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

Contaminated field samples of 14 pounds per gallon (ppg) calcium bromide brine were obtained. Samples #1 and #2 were contaminated with iron and samples #3 and #4 were contaminated with zinc. The weight percent of the metal ion contaminant was determined via inductively coupled plasma analysis. One barrel of each of samples #1-#4 was poured into a mixing container. Calcium oxide (CaO) was added to samples #1 and #3 and calcium hydroxide ($Ca(OH)_2$) was added to samples #2 and #4 as the lime. The samples were mixed for approximately 2-3 hours and allowed to sit for approximately 16 hours. The samples were then filtered using a vacuum filtration method consisting of a Buchner funnel and glass fiber filter paper until all the filtrate was collected. The metal ion contamination was then determined for each of the samples. The results are listed in Table 1.

TABLE 1

| Sample # | Field Sample (Ctl) | $Ca(OH)_2$ Addition | CaO Addition |
|---|---|---|---|
| 1 - iron wt. % | 3.74 | — | 0.001 |
| 2 - iron wt. % | 3.74 | 0.001 | — |
| 3 - zinc wt. % | 3.68 | — | 1.04 |
| 4 - zinc wt. % | 3.68 | 1.9 | — |

As can be seen in Table 1, the amount of metal contamination in the field samples was greater than 3.5% by weight of the brine. However, both types of lime resulted in a reduction of metal contamination to values of less than 2% by weight, which is an acceptable level indicating the brines would be suitable for use in oil or gas operations. Both types of lime resulted in reclaimed brines with very little iron contamination. This indicates that either type of lime could be used to effectively remove iron contamination. Moreover, the quicklime (CaO) functioned better to remove the zinc contaminate compared to the slaked lime (Ca(OH)$_2$). This indicates that one type of lime may function more effectively to create insoluble metal ions in the brine.

Table 2 contains the specific gravities of the field samples and the filtrate from samples #1-#4 after the addition of the lime and filtration. As can be seen, the lime-treated samples had almost the exact same specific gravities compared to the control field samples. This indicates that the addition of the lime does not substantially affect the density of the fluid, which alleviates the need to add additional salts or weighting agents to restore the density of the reclaimed brine.

TABLE 2

| Sample # | Field Sample (Ctl) | Ca(OH)$_2$ Filtrate | CaO Filtrate |
|---|---|---|---|
| 1 | 1.69 | — | 1.68 |
| 2 | 1.69 | 1.68 | — |
| 3 | 1.69 | — | 1.68 |
| 4 | 1.69 | 1.68 | — |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A method of removing a soluble metal ion from a contaminated brine fluid comprising:
adding lime to the contaminated brine fluid, wherein the lime causes the soluble metal ion to become insoluble in the contaminated brine fluid without addition of an oxidizer; and
passing the contaminated brine fluid through a filter media, wherein the filter media comprises lime, wherein the step of passing is performed after the step of adding, and wherein after the contaminated brine fluid is passed through the filter media, a brine fluid having a reduced concentration of the metal ion is produced; wherein the contaminated brine fluid is passed through the filter media using a pressure filter assembly; and wherein the pressure filter assembly is a continuous filter assembly, and the length of time for filtration is in the range of about 12 hours to about 4 days.

2. The method according to claim 1, wherein the soluble metal ion is iron, zinc, or combinations thereof.

3. The method according to claim 1, wherein the contaminated brine fluid comprises a salt, and wherein the salt is selected from the group consisting of sodium chloride, calcium chloride, calcium bromide, potassium chloride, potassium bromide, magnesium chloride, sodium bromide, cesium formate, cesium acetate, and any combination thereof.

4. The method according to claim 1, wherein the contaminated brine fluid comprises a base fluid, and wherein the base fluid comprises water.

5. The method according to claim 1, wherein the contaminated brine fluid has a density in a range of 8 to 20 pounds per gallon prior to the step of passing.

6. The method according to claim 5, wherein the brine fluid that has passed through the filter media has a density that is within 10% of the density of the contaminated brine fluid prior to the step of passing.

7. The method according to claim 1, wherein the brine fluid becomes contaminated with the soluble metal ion prior to, during, or after use in an oil or gas operation.

8. The method according to claim 1, wherein the lime is selected from the group consisting of calcium oxide, calcium hydroxide, calcium carbonate, and combinations thereof.

9. The method according to claim 1, wherein the lime is added to the contaminated brine fluid in a concentration in the range of 3 to 35 pounds per barrel of the contaminated brine fluid.

10. The method according to claim 1, wherein the filter media further comprises a filter aid.

11. The method according to claim 10, wherein the filter aid is selected from the group consisting of diatomaceous earth, glass fibers, glass wool, silica gel, alumina, paper, activated charcoal, and combinations thereof.

12. The method according to claim 1, wherein the concentration of the metal ion is reduced to a value of less than or equal to 2% by weight of the brine fluid.

13. The method according to claim 1, further comprising introducing the brine fluid into a wellbore, wherein the wellbore penetrates a subterranean formation, and wherein the step of introducing is performed after the step of passing.

14. The method according to claim 13, wherein the brine fluid is used in a drilling fluid, completion fluid, workover fluid, injection fluid, or stimulation fluid.

15. The method according to claim 13, wherein the step of introducing is performed using a pump.

16. A method of removing a soluble metal ion from a contaminated brine fluid comprising:
passing the contaminated brine fluid through a filter media, wherein the filter media comprises lime, wherein the lime causes the soluble metal ion to become insoluble in the contaminated brine fluid without addition of an oxidizer, and wherein after the contaminated brine fluid is passed through the filter media, a brine fluid having a reduced concentration of the metal ion is produced, wherein the contaminated brine fluid is passed through the filter media using a pressure filter assembly, and wherein the pressure filter assembly is a continuous filter assembly, and the length of time for filtration is in the range of about 12 hours to about 4 days.

17. The method according to claim 16, wherein the lime is selected from the group consisting of calcium oxide, calcium hydroxide, calcium carbonate, and combinations thereof.

18. The method according to claim 16, wherein the filter media further comprises a filter aid, and wherein the filter aid is selected from the group consisting of diatomaceous earth, glass fibers, glass wool, silica gel, alumina, paper, activated charcoal, and combinations thereof.

19. The method according to claim 16, wherein the concentration of the metal ion is reduced to a value of less than or equal to 2% by weight of the brine fluid.

20. The method according to claim 16, wherein the soluble metal ion is iron, zinc, or combinations thereof.

* * * * *